United States Patent [19]

Löken

[11] 3,895,999

[45] July 22, 1975

[54] PROCESS FOR OBTAINING A CRUDE SAPOGENIN FROM AGAVE LEAVES

[75] Inventor: Bjarte Löken, Milan, Italy

[73] Assignee: Omni Research Incorporated, San German, P.R.

[22] Filed: Jan. 22, 1974

[21] Appl. No.: 435,464

[52] U.S. Cl. .................. 195/7; 195/32; 195/82; 260/210.5
[51] Int. Cl.² ........................................... C12B 1/00
[58] Field of Search ............... 195/2, 3 R, 27, 37, 7, 195/51 R, 32, 82; 260/210.5

[56] References Cited
UNITED STATES PATENTS
2,798,025  7/1957  Spensley ............................... 195/32
3,510,400  5/1970  Loken et al ............................ 195/37

Primary Examiner—Lionel M. Shapiro
Assistant Examiner—R. B. Penland
Attorney, Agent, or Firm—Fidelman, Wolffe & Leitner

[57] ABSTRACT

A process for recovering sapogenin from agave leaves comprising squeeze expressing a virgin juice from the leaf prior to decortication, then concentrating the steroid values in the juice, followed by acid hydrolysis. The sapogenin constitutes a water insoluble reaction product in the hydrolyzate and can be recovered therefrom e.g. by filtration as "coffee grounds." The coffee grounds can be purified by extraction to yield high quality sapogenin.

Desirably from 10–30 percent of the leaf weight is expressed as juice.

Concentration through evaporation is preferred to preserve the sugar content of the juice. The hydrolyzate filtrate can serve as a fermentation nutrient for yeast and/or alcohol production.

7 Claims, No Drawings

PROCESS FOR OBTAINING A CRUDE SAPOGENIN FROM AGAVE LEAVES

This invention relates to the recovery of sapogenins from plant juices and in particular to recovery of steroidal sapogenins, notably hecogenin and tigogenin, from leaves of sisal, henequen, cabuya and the like (*Agave sisalana, A. furcroides, A. lentonaceum, A. mexicana*).

As is well known, the juices of the leaves contain steroidal saponins in solution, and such saponins are convertable to water insoluble sapogenins by hydrolysis reactions. Since the agave plants are widely cultivated for the fiber content of the leaf, the concept of securing sapogenins as a sisal fiber byproduct has been explored at length by workers in the steroid arts. Unfortunately, the saponin content in the leaf is too low and difficult to recover for steroids to become the principal product and fiber a secondary product. The practice has been to recover steroids from leaf pulp and/or leaf juices remaining after decortication separated out the fiber product.

An additional problem is that operators of the most likely sapogenin sources, namely large, centralized decorticator operations, increase their fiber yield by adding liberal quantities of water during decortication, resulting in substantial dilution of the saponin content in the leaf pulp and juice residue. Decortication without water addition is also practiced, but usually on a relatively small scale and mostly on a scale too small for efficient recovery of steroid values from the leaf juices.

Sapogenin recovery from the plant juices cannot be carried out as a casual incidence of fiber recovery, even when only the leaf juices (i.e. no treatment of pulp) and added water are processed, and naturally occurring fermentation is relied upon to concentrate the steroid values therein 5 or 6 fold. To obtain commercially significant quantities, the steroid recovery operation must be on a large scale. Recovery of 50 kg/day sapogenin, e.g. hecogenin, at a decortication installation employing wash water that dilutes the juice five-fold, requires a daily storage fermentation vat capacity of 300,000 liters. Since natural fermentation requires about 5 days, six such vats will be needed and, with them, an appropriate investment in pumps and piping to handle such quantities of liquid.

The substantial financial commitment at the sisal plantation or estate and relatively large scale operations involved with commercial scale sapogenins recovery from agave leaves makes attractive the "total juice" treatment of all available source material, namely pulp as well as juice. In total juice recovery, the residual leaf pulp is screw-pressed to express a secondary juice product therefrom and the debris laden secondary juice too is fermented or otherwise processed for its steroid content. The secondary juices obtained from leaf pulp contain a high level of waxes, lipoids, phosphatides, chlorophyll. Many elaborate procedures have been suggested to the art for recovering sapogenins from total juice.

It is believed that the art has so concerned itself with maximum reasonable sapogenin recovery at each installation, little or no attention has been paid to the very possibility that the complex recovery systems involved in total juice work-up with need for solvents and reagents, and with severe purification problems, constitute a self-defeating situation. Overall, the result has been that many, perhaps most by far, sisal plantations do not bother to recover the steroid values from their leaf juices. Corticoids, for which hecogenin is an apt source material, continue to be produced from diosgenin, whose source is the wild-growing barbasco (*dioscoreaceae*).

The object of this invention is to provide a superior process for recovering sapogenins from agave leaves.

Briefly stated, the process of the present invention involves pre-squeezing the agave leaves to express juice therefrom in the amount of 10-30 percent of the leaf weight followed by concentrating the steroid values of the juice, then recovering the sapogenin content in solid form.

A principal point of departure of the concepts and practice of the present invention from prior art practices and suggestions is that the leaf juice is obtained prior to decortication, not during the course of decortication or subsequent to decortication. In consequence, the great dilution of leaf juice occasioned by use of water during decortication to improve fiber recovery does not result. Substantially lessened quantities of juice liquids must be handled. Nor is the decortication process itself adversely affected. When only 10 percent of the leaf weight of juice is squeezed out, no damage occurs to the fiber. To the contrary, the leaf, particularly the wide butt portion thereof, softens up. Decortication is facilitated; fiber recovery may be increased. It is, of course, possible to squeeze intensely, remove 40-50 percent of the leaf weight as juice, thereby increasing sapogenin yield per leaf. However, increasing juice yield causes some decrease in fiber yield and an increasing degree of contamination of the juice with pulp particles and debris. The proper level of squeezing will normally be a compromise between juice yield, juice purity, and fiber yield loss. Expressing more than 40 percent by wt. as juice is undesirable, less than 30% is preferred for juice purity reasons, 10-30 percent being then the preferred range.

The rationale of the present invention is that agave leaf juice treatment procedures heretofore suggested to the art have been so complex, requiring so great a financial and operational commitment that many major, well integrated sisal planatations have declined to engage in the business of recovering sapogenins. Such plantations are advanced agriculturally and technically with strategically placed decorticator machines, adequate labor and ancillary services, etc. Their decorticator machines handle enough agave leaves to permit sapogenin recovery on the skimming basis of the present invention wherein only that portion of the juice recovered and treated at minimum cost is processed. Commercially attractive quantities of sapogenin can, in many places, be recovered by skimming off only the purest juice. Let the balance go to waste, as has been the custom at that decorticator site anyway. Agave cultivation is conducted on such a vast scale, no hope exists for utilizing all the sapogenins which in theory can be recovered from agave leaves. The real problem, heretofore, has been that less sapogenins are recovered from agave leaf sources than is reasonable.

It has been found that a clear, transparent juice is obtained when the leaves are passed through a plain (no grooves or corrugations) roller press with the rolls spaced to express only about 10 percent of the leaf weight as juice. Little or no plant waxes or other lipoids are present. The juice constitutes a clear, aqueous solution of saponin, sugars, organic acids and other plant materials with an average solids content of about 7 percent. The freshly squeezed clear juice may be termed virgin juice.

As has already been indicated, the proportion of juice leaf weight squeezed out by appropriate squeeze roll setting, will vary installation to installation within the range of 10-40 percent, and preferably 10 to 30 percent, so as to recover reasonably high quality virgin juice, with mininal damage to the fiber product. Since collecting clear virgin juice from freshly cut leaves (prior to decortication) by roller pressing constitutes a selective extraction of steroid values in the form of what amounts to an aqueous solution of saponin uncontaminated with suspended materials (that contain water insoluble lipoids, waxes, etc.), the degree of juice expressed per leaf should be balanced carefully against the increasing degree of contamination with pulp particles and other plant debris which occurs as juice yield per leaf is increased.

Since each installation must produce sufficient juice to justify recovery of the sapogenins therefrom, the compromise between juice quality and quantity may have to be shaded toward quantity. Every effort must be made to avoid transport of fresh juice by truck or pipeline, since even the highest quality virgin juice is too dilute in saponin for transport expenses.

One factor governing the squeeze level is whether local conditions permit full work up of the virgin juice. The local conditions may be such that naturally occurring fermentation, settling out of the steroid values and decantation, all as is well known to the art, might be the only feasible way to concentrate the steroid values present in the juice. In such instances, the separation is much facilitated if the virgin juice does not contain particulate matter such as pulp and plant debris. Since undiluted pure virgin juice is being handled and such juices behave in a superior manner, relatively small fermentation vats will suffice to produce a greatly concentrated hemisaponin layer; ratios of 1:10, 1:18 have been obtained, which is an advantage. Moreover, the sapogenin hydrolysis product is purer. Alternatively, limited distance transport of hemisaponin concentrate to a central processing facility may be justified. In this connection, concentration of the steroid values by lime coprecipitation according to known prior art practices may facilitate limited transport of very crude material to a central processing facility.

Preferred practice of this invention, however, is to concentrate the steroid values in the juice by evaporation, desirably by simply boiling the virgin juice in an open-to-the-atmosphere steam heated (i.e. jacketed) kettle. Low pressure steam should be used to avoid caramelizing the sugars and saponins. The average solids content of fresh virgin juice is about 7 percent. Evaporation concentration in excess of 1:5 is quite feasible. A 1:8 concentration results in a viscous liquid having about 55 percent dissolved solids, much of which (e.g. 40 percent) is fermentable sugar. The liquid filtrate residue remaining after acid hydrolysis of the saponin content to (insoluble) sapogenins according to the procedures of U.S. Pat. No. 3,136,761 or 3,510,400 constitutes a good fermentation medium for production of alcohol or yeast.

Desirably hydrolysis of the concentrated juice, regardless of how concentration was effected, is carried out according to the teachings of U.S. Pat. 3,510,400. Briefly, the hydrolysis involves subjecting concentrated virgin juice to mild acid hydrolysis at a pH in the range of pH 1.0-2.5 at temperatures in the range of 110°-145°C. followed by partial neutralization e.g. to pH 5-6, after which the insolubilized sapogenin may be recovered by filtration. It is noteworty that the pH 1.0-2.5 refers to a measured pH, not to one calculated on the basis of fluid volume and added acid. The sapogenin containing hydrolysate solids usually have from 6 to 20 percent sapogenin, a content great enough to justify transport from a sisal plantation to a more convenient location for solvent extraction purification of the sapogenin.

Practice of this invention is not limited to recovery of any particular sapogenin. Many species of agave are cultivated for their fiber content. Recoverable quantities of one sapogenin or another, sometimes in admixture, are present in the leaf juices of commonly cultivated agave species. In particular, hecogenin and tigogenin occur in admixture in the sapogenin product from the leaf juices of most agaves cultivated for fiber purposes. An exception is *Agave sisalana,* which in Africa gives rise to a sapogenin product consisting almost exclusively of hecogenin. The same species grown in Haiti produces a hecogenin-tigogenin mixture with from 15-35% tigogenin. From the Mexican henequen (*Agave furcroides*) a mixed product is obtained with 60-75 percent hecogenin, balance mostly tigogenin. The cabuya in Colombia produces a mixture of 4 sapogenins including hecogenin and tigogenin. Sources of tigogenin include the local henequen in Honduras, essentially *Agave lentonaceum* and, in admixture with hecogenin, the henequen from the state of Tamaulipas in Mexico. Both tigogenin and hecogenin have commercial potential. Mixed sapogenins can be separated, e.g. by the procedure disclosed in out copending application Ser. No. 435,645, filed concurrently herewith.

Accordingly, the real basis for practice of the present invention is almost entirely the availability of major sisal operations with large scale decorticator operations strategically positioned so that the number of agave leaves processed can provide the minimum quantities of virgin juice needed for production therefrom of a commercially attractive quantity of sapogenin. Although low capital requirements and a relatively small scale operation are contemplated for practice of this invention, a need still exists for production on the site of commercially worthwhile quantities of sapogenin. Thus, to repeat, the sisal decortication operation on the site must be on a large scale.

Any decorticator site selected can support readily the rather modest equipment needs for practice of this invention; which, at a minimum include:

i. rollers to express virgin juice;
ii. an open jacketed reactor (glass lined);
iii. filter press;
iv. small boiler e.g. 25-100 HP;
v. service equipment such as pumps and whatever piping and electrical gear needed to hook into the water and electricity service available at the decorticator site.

An open glass lined jacketed reactor will suffice for both evaporation concentration and an acid hydrolysis of the saponin. Efficient hydrolysis of evaporated agave leaf concentrated juice can be carried out in 15 hours at pH-1 at atmospheric pressure. At pH-0.5, the hydrolysis time is reduced to 4-5 hours. The acid can be added prior to or during evaporation.

Preferred practice of the invention would include a separate hydrolysis reactor, one capable of operating under pressure so acid hydrolysis temperatures of 125°C. can be employed, an expedient which lowers acid usage. Normally, evaporation concentration of 1:4-6 is effected, but if hydrolysis reactor capacity is a limiting factor, concentration of 1:8 may be effected.

Additional equipment which may be included on the site is fermentation capacity for fermenting the sugar containing hydrolysate filtrate so as to produce a yeast or alcohol by-product at the steroid recovery installation, should circumstances make yeast or alcohol production a desirable adjunct to sapogenin recovery. On the other hand, if the hydrolyzate filtrate is to be discarded, saponin concentration by natural fermentation may well be substituted for evaporation. For sites with high fuel costs, provision of (relatively small) juice fermentation tanks may be more advantageous than provision of an evaporator. As has been indicated, concentrations of up to 1:10 and more can be effected by a naturally occurring fermentation (optimum at 38°-40°C) which causes the steroid values to concentrate as a hemisaponin precipitate slurry in the lower part of the vat.

Recovery of a relatively small proportion of clear virgin juice from agave leaves prior to their decortication, offers more than the already described advantage of requiring a relatively little tankage, since undiluted juice is being concentrated. Virgin juice, as a steroid source material, has advantages which carry completely through the entire sapogenin recovery sequence. As compared to primary juice, even undiluted, the virgin juice contains fewer wax and lipoid impurities. If concentration by natural fermentation is employed, a greater degree of concentration can be obtained; 1:10 as compared to 1:5 or 1:6. In addition, the hydrolyzate filter cake or coffee grounds resulting from hydrolysis of virgin juice is superior to like hydrolyzates from primary juice or from total work up sources, because only traces of contaminating lipoids are present. For treatment of the hydrolyzate solids, selective extraction solvents are not required, which makes toluene a preferred solvent for recovery of sapogenin from coffee grounds. During purification and recovery of an ultimate genin product, e.g. hecogenin from high hecogenin sources, the crude hecogenin from primary juice requires recrystallization, while the like product derived from virgin juice does not need a recrystallization step. A crystalline product may often be obtained directly from the toluene extract.

For further understanding of the present invention, reference is made to the following specific examples:

EXAMPLE I

At a Mexican sisal estate decorticator, smooth rollers were installed for squeezing the freshly (within 8 hrs) cut leaves. Their capacity was 30,000 leaves per hour or 300,000 leaves per 10 hour working day. The rollers were set so that 15,000 l of clear virgin juice was obtained over the 10 hour day. The average leaf weight was about 500g. Thus, the juice collected represented about 10% of the leaf weight. The expressed juice was passed over a screen to remove plant debris and large particles of any solid matter (which tend to contaminate by accident).

The clear juice was pumped from its catch basin receptacle into a jacketed open heating tank of about 2000 gal. capacity. Heating with low pressure steam in the jacket was started immediately, evaporating at a lower rate than the rate of feed from the catch basin. When the evaporation tank was about full, the virgin juice flow was diverted to a purge tank, and from there pumped into the evaporation tank at intervals so as to replenish what had evaporated. (A flow meter recorded the volume of juice pumped into the evaporation vessel). After the entire daily production of clear juice (15,000 l = 4000 gal) passed into the reactor, the evaporation was continued until the volume was down to 2500 l (650 gal). At this point, enough concentrated sulfuric acid was added to achieve a measured pH of pH-0.7.

In the case of the concentrated juice, some natural buffers are present ($Ca^{++}$ salts, $Mg^{++}$ salts, nitrogen bases). If the extract had been distilled water, 2% w/w would give a 4/10 N acid or pH of 0.4. In this case, when measuring the pH of the 650 gal of concentrated extract, it was 0.7 (corresponding to 2/10 N). At different times of the year, the buffer content may vary. As the rate of hydrolysis is a direct function of the $H_3O+$ concentration, direct measurement of pH is desirable.

For the 2500 l (650 gal) volume, there was added 54kg sulfuric acid (techn. conc.), diluted in 100 l of iced water. The reaction mixture was then hydrolyzed by maintaining gentle boiling for a period of 9 hours. A slurry of brown black precipitate was obtained. The reaction mixture was cooled by flowing cooling water inside the tank jacket, then transferred to the purge tank in order to make the evaporation tank available for processing the current day's juice. The solid hydrolysate was collected in a filter press, washed and back washed with water. Hard artesian water is preferred because of its acid neutralizing capacity. By this time, the purge tank was available for receiving clear juice, as happens when the evaporation tank becomes filled. (Usually the purge tank is needed from about 2:00 in the afternoon.)

The hydrolysate filter cake is removed from the filter press and dried in the sun. 150 kg of coffee grounds were obtained. The hydrolysate is termed coffee grounds because it looks like ground coffee. Exhaustive extraction with heptane showed the coffee grounds to contain 8 percent sapogenin (12kg in total) of composition, 70 percent hecogenin, 30 percent tigogenin.

The hydrolysate filter cake was collected and accumulated. 1 month's production is about 3.5 tons per decorticator. It is sent in two ton allotments to a central facility for extraction, purification of the sapogenin and separation out of a pure hecogenin product.

EXAMPLE II

At another decorticator, the capacity and supply of leaves and juice were as in Example 1, but the evaporation reactor tank or vessel was smaller - 1500 gal (6000 l). However, the purge tank was a jacketed vessel of about 1000 gal (4000 l). As soon as the evaporator reactor was filled with juice, 54 kg techn. conc. sulfuric acid diluted to 100 l with ice water was added and the boiling continued so as to evaporate and hydrolyze simultaneously. The juice coming from the catch box was diverted to the purge tank which is heated, and kept boiling. At intervals, the juice level in the evaporation/hydrolysis reactor was made up by pumping in hot, partially evaporated juice from the purge tank. An exact record was kept on the total amount of juice handled by flow meter control. It was noted that the combined evaporation/hydrolysis reactor could be run with relatively high steam pressure heating because no foaming occurred. About one hour after shutting down the rollers and the decorticator for the night, all the 15,000 l of fresh juice had been added to the evaporation/hydrolysis reactor and the purge tank was empty. At this point, the pH was found to be 0.9 and 25kg more sulfuric acid (conc. Tech.) was added, which brought the pH to 0.5. Four more hours of boiling was sufficient to complete hydrolysis. The reaction product slurry was filtered immediately after cooling by passing water through the jacket so as to complete the processing sequence before start of the morning shift operation. Obtained was 160 kg coffee grounds; 7 percent sapogenin content.

EXAMPLE III 15 l of virgin juice was left stirring in an open vessel at 35°–38°C. Assay of the original juice showed a sapogenin content of 0.8 promille. After 4 days of fermentation, the stirring was stopped and the mixture allowed to stratify. The temperature was lowered to 26°. After 2 days of rest, there was an almost clear supernatent and a slurry on the bottom. The slurry occupied about 1/6 of the total volume.

Assay of the clear supernatant showed a sapogenin content of 0.2 promille, indicating more than 75 percent of the original sapogenin content concentrated in the lower slurry layer. The clear upper layer was decanted and to the slurry was added sulfuric acid to pH N 0.7 (59g technical sulfuric acid was needed) and the mixture was refluxed 3¼ hours, (Pressure reaction vessel used). The solid hydrolysate (coffee grounds) was harvested by filtration (Buchner) and washed with water to neutrality, then collected and dried. 140g of coffee grounds was obtained, which on exhaustive toluene extraction gave 10.2g of crude sapogenin in a crystalline form merely by concentration of the toluene extract.

EXAMPLE IV 15 l of virgin juice from African *A. sisalana* was processed according to the method of Example III. The 127g of coffee grounds obtained was exhaustively extracted with toluene and the toluene extract thereafter concentrated. 14g of pure crystalline hecogenin crystallized directly from the concentrated toluene extract.

EXAMPLE V 15 l of the hydrolysis filtrate from Example 1 was neutralized with lime and inoculated with saccharomyces (Baker's yeast). Fermentation for 3 days under anaerobic conditions at 28° followed by scavenging distillation gave a yield of 95 percent alcohol corresponding to 1,4 l.

EXAMPLE VI 15 l of the hydrolysis filtrate from Example I was neutralized with ammonia, then innoculated with a strain of torula yeast. The temperature was maintained at 28° and air was blown in through a fritted disc equipped glass tube. The progress of the yeast build up was followed analytically by the decreasing sugar content. (In instances where the sugar content stabilizes, it is necessary to add some soluble phosphate, preferably as a potassium salt, for the yeast also needs potassium).

After 24 hours (or when the sugar content is zero), the yeast was separated by centrifugation and dried to give about 3kg yeast with a 40 percent protein content (N, 6.25).

EXAMPLE VII 15 l of the ammonia neutralized hydrolysis filtrate from Example 1 was innoculated with a strain of *Saccharomyces* and processed as described in Example V. 2,3kg of feed yeast was obtained, demonstrating the much better utilization of the torula strain - known to metabolize pentoses - than the *saccharomyces*.

What is claimed is:

1. A process for recovering a crude sapogenin containing product from agave leaves, which comprises:
   squeezing a virgin juice from agave leaves prior to any decortication thereof, the virgin juice being expressed in amount of from about 10–40 percent by weight of the leaves;
   thereafter concentrating the saponin steroid values present in the virgin juice;
   then acid hydrolyzing the steroid value containing concentrate to thereby convert saponin steroid values into a water insoluble sapogenin containing solids hydrolyzate product;
   and recovering said water insoluble sapogenin containing hydrolyzate product from the aqueous portion of the hydrolyzate.

2. The process of claim 1 wherein the juice expressed from the agave leaves constitutes from about 10–30 percent by weight of the leaves.

3. The process of claim 1 wherein the concentration is effected by a naturally occurring fermentation of the virgin juice productive of a slurry phase and a clear phase, the slurry phase being concentrated in steroid values.

4. The process of claim 1 wherein the concentration is effected by non-caramelizing evaporation of the virgin juice.

5. The process of claim 4 wherein the aqueous hydrolyzate is thereafter fermented to yield yeast and alcohol products.

6. The process of claim 5 wherein the fermentation is effected aerobically with torula yeast to yield only a yeast product.

7. The process of claim 1 wherein the recovered crude sapogenin containing product containing from about 5–20 percent of sapogenin therein is extracted with toluene to recover therefrom a crystalline sapogenin product.

* * * * *